(12) United States Patent  
Chen

(10) Patent No.: US 7,309,882 B2  
(45) Date of Patent: Dec. 18, 2007

(54) SURFACE LIGHT SOURCE WITH PHOTONIC CRYSTAL LED

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 266 days.

(21) Appl. No.: 11/093,522

(22) Filed: Mar. 30, 2005

(65) Prior Publication Data

US 2005/0174797 A1    Aug. 11, 2005

(30) Foreign Application Priority Data

Apr. 2, 2004    (TW) .............................. 93109181 A

(51) Int. Cl.  
*H01L 33/00* (2006.01)

(52) U.S. Cl. .................. 257/98; 257/E33.067; 977/950

(58) Field of Classification Search ........ 257/E33.003, 257/E33.06, E33.067; 977/949, 950  
See application file for complete search history.

(56) References Cited

U.S. PATENT DOCUMENTS 6,586,874 B1 * 7/2003 Komoto et al. ............. 313/503

7,166,871 B2 * 1/2007 Erchak ......................... 257/95  
2003/0141507 A1 * 7/2003 Krames et al. ............... 257/79  
2005/0173717 A1 * 8/2005 Lee et al. ..................... 257/98

FOREIGN PATENT DOCUMENTS

CN    2496052 Y    6/2002  
CN    1426117 A    6/2003

* cited by examiner

*Primary Examiner*—Carl Whitehead  
*Assistant Examiner*—Jennifer M. Dolan  
(74) *Attorney, Agent, or Firm*—Morris Manning Martin LLP; Tim Tingkang Xia, Esq.

(57) ABSTRACT

A backlight system (20) includes a light guide plate (220), a reflector (230) disposed below the light guide plate, and an LED (210) emitting light beams into the light guide plate. The LED includes an LED chip (213), which has a base (2131), a film layer (2132), a protecting layer (2133), and an organic layer (2134) sequentially stamped on a first electrode (212) from bottom to top. The LED chip further has an optical crystal structure including a plurality of micro-holes (2135) which run through the film layer, the protecting layer and the organic layer.

16 Claims, 4 Drawing Sheets

SURFACE LIGHT SOURCE WITH PHOTONIC CRYSTAL LED

BACKGROUND OF THE INVENTION

1. Field of the Invention

The present invention relates to electronic displays, and more particularly to a photonic crystal LED-based (light emitting diode-based) surface light source for an LCD (liquid-crystal display).

2. Prior Art

In general, LCDs have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide uniform light for a clear display.

A surface light source comprises a light source and a light guide plate. The light source may be an LED, or one or more fluorescent lamps. Compared to conventional backlights that use fluorescent lamps, LEDs are less expensive, last longer, contribute to a more robust design, and provide a higher brightness-to-size ratio. The light guide plate has an end face through which light is introduced, and two opposite major faces one of which functions as an emission face. The performance of the surface light source greatly depends on the characteristics of the light guide plate employed therein.

A light guide plate functions to change a direction of propagation of light beams emitted from the light source and introduced into the light guide plate, from a direction roughly parallel to the emission face of the light guide plate to a direction perpendicular to the emission face. That is, the light guide plate effectively changes the linear or point light source(s) into a surface light source, for evenly illuminating a whole display screen of the LCD.

FIG. 7 shows a conventional LED 110, which includes a substrate 111, a first electrode 112, a second electrode 115, a wire 116, an LED chip 113, and an encapsulating resin 114. The LED chip 113 is mounted on the first electrode 112 by a dielectric glue, and electrically connects with the second electrode 115 through the wire 116. The encapsulating resin 114 covers the LED chip 113, for protecting the LED chip 113 from water vapor. The LED chip 113 has abase layer 1131 and a film layer 1132. The LED chip 113 further has a plurality of emitting modes, in which light beams are emitted from different emitting directions. Therefore, the LED chip 113 produces total internal reflection and diffusing, which decreases the extraction efficiency and emitting intensity of the LED 110.

FIG. 8 shows a conventional surface light source 10, which comprises a reflector 130, a light guide plate 120, a diffuser 140, a brightness enhancing film (BEF) 150, two point light sources 110, and two light source covers 160 partially covering the light sources 110 respectively. The reflector 130, the light guide plate 120, the diffuser 140 and the BEF 150 are stamped together from bottom to top in that order. The light guide plate 120 comprises a top light emitting surface 122, a bottom surface 123, and a pair of opposite incident surfaces 121. The point light sources 110 are disposed adjacent the incident surfaces 121 respectively. In use, light beams from the point light sources 110 enter the light guide plate 120 through the incident surfaces 121, are emitted from the light emitting surface 122, and then are introduced into the BEF 150 in a direction perpendicular thereto. The BEF 15 converges the light beams in a predetermined direction to evenly illuminate a whole display screen of an associated LCD. Each point light source 110 is the LED of FIG. 7 described above.

In use, the LED 110 has a relatively low emitting intensity, which decreases the optical characteristics of the surface light source 10 and the associated liquid crystal display. In addition, the surface light source 1 generally needs to comprise all the above-described elements, including the diffuser 14 and the BEF 15, for enhancing brightness. This adds to the size, the cost, and the difficulty of the manufacturing the surface light source 10.

A new surface light source for an LCD which overcomes the above-mentioned disadvantages is desired. In particular, what is needed is an LED having a high extraction efficiency, and a surface light source utilizing the LED for high illumination.

SUMMARY OF THE INVENTION

A backlight system includes a light guide plate, a reflector disposed below the light guide plate, and an LED emitting light beams into the light guide plate. The LED includes an LED chip, which has a base, a film layer, a protecting layer, and an organic layer sequentially stamped on a first electrode from bottom to top. The LED chip further has an optical crystal structure comprising a plurality of micro-holes.

Other advantages and novel features of the invention will become more apparent from the following detailed description when taken in conjunction with the accompanying drawings, in which:

DETAILED DESCRIPTION OF THE INVENTION

Hereinafter, preferred embodiments of the present invention will be explained in detail with reference to the accompanying drawings.

Figure 1:
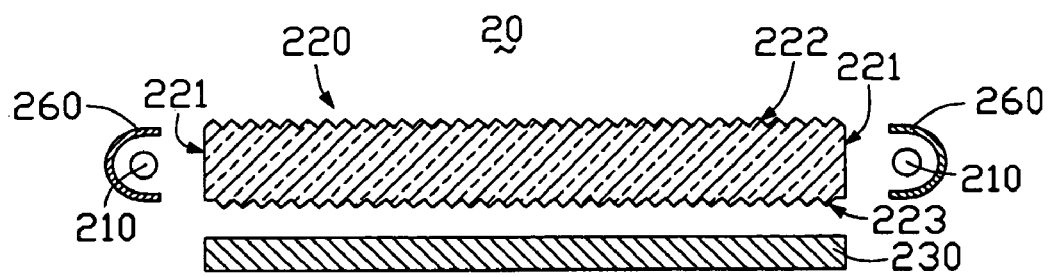
FIG. 1 is an exploded, cross-sectional view of a surface light source according to a first embodiment of the invention.

Referring to FIG. 1, a surface light source 20 in accordance with a first embodiment of the present invention comprises a plate-like light guide member 220, and two light sources 210 disposed adjacent to the light guide plate 220. Each light source 210 is a point light source such as an LED, and emits light beams to the light guide plate 220. Two light source covers 260 partially cover the light sources 210 respectively, and reflect light beams emitted by the light sources 210 into the light guide plate 220.

The light guide plate 220 defines a light emitting surface 222, a bottom surface 223 opposite to the emitting surface 222, and two light incident surfaces 221 perpendicular to the emitting surface 222 and the bottom surface 223. The light guide plate 220 is rectangular, square or another shape, and is made from a transparent glass or synthetic resin. Various kinds of highly transparent synthetic resins may be used, such as acrylic resin, polycarbonate resin, vinyl chloride resin, etc. Furthermore, the emitting surface 222 defines a plurality of V-shaped grooves for converging the light beams in a predetermined direction.

A large number of V-shaped grooves (not labeled) is defined in the bottom surface 223, for eliminating total internal reflection of the light beams in the light guide plate 220. That is, light beams incident on the light guide plate 220 are reflected and scattered at the V-shaped grooves in directions toward the emitting surface 222. Further, a reflector 230 is disposed below the bottom surface 223 of the light guide plate 220.

Figure 2:
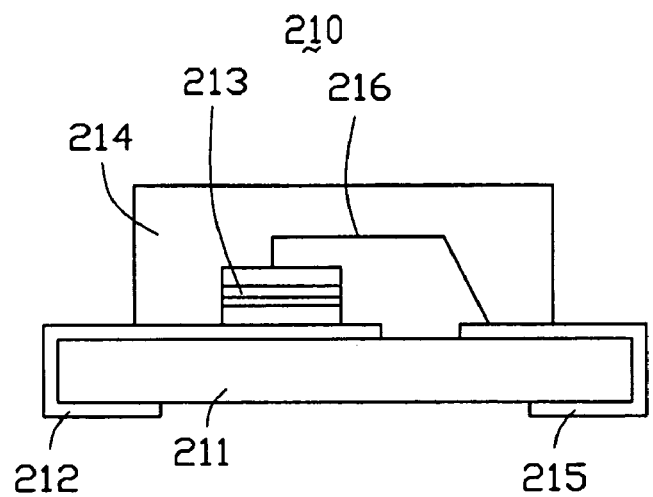
FIG. 2 is an enlarged, side view of an LED of the surface light source of FIG. 1.
Figure 3:
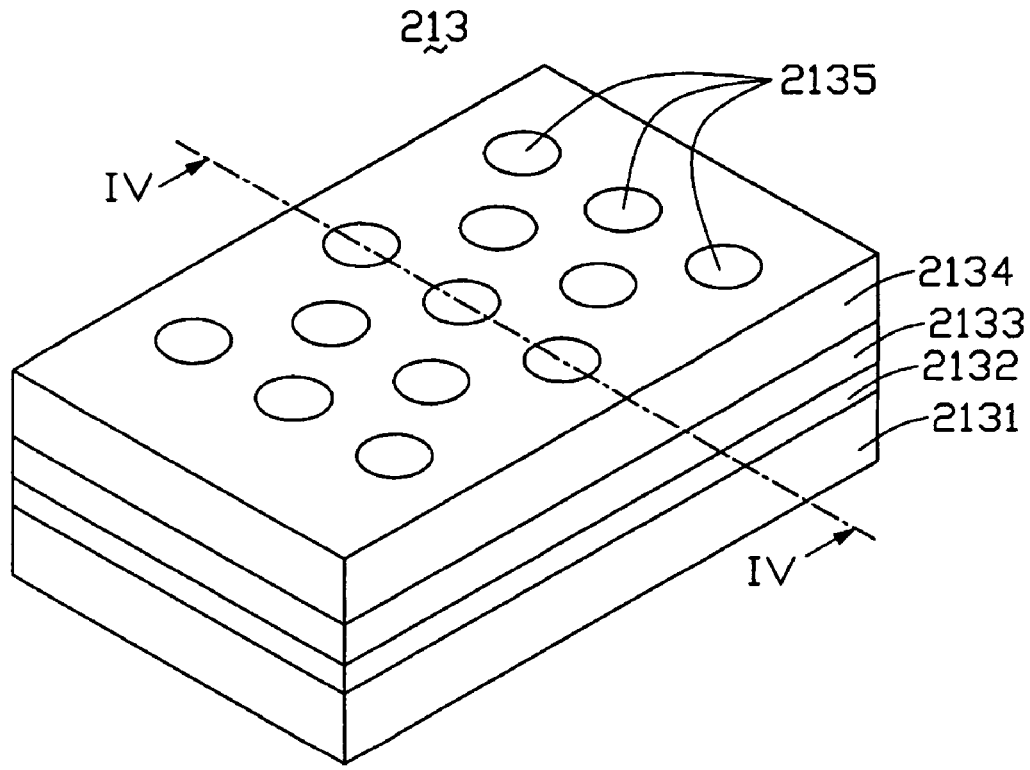
FIG. 3 is an enlarged, isometric view of an LED chip of the LED of FIG. 2.
Figure 4:
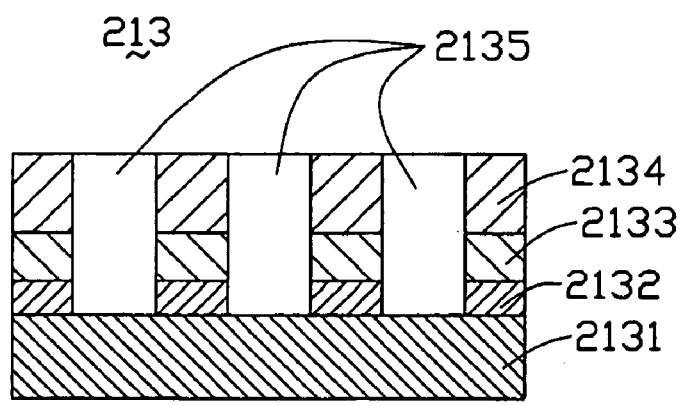
FIG. 4 is a cross-sectional view taken along line IV-IV of FIG. 3.

As shown in FIGS. 2, 3, and 4, the LED 210 includes a substrate 211, a first electrode 212 formed on the substrate 211, a second electrode 215 formed on the substrate 211 opposite to the first electrode 212, an LED chip 213 as a light emitter attached on the first electrode 212 by a dielectric glue, a wire 216 electrically connecting the second electrode 215 and the LED chip 213, and an encapsulating resin 214 covering the LED chip 213. The encapsulating resin 214 is used to protect the LED chip 213 from static electricity, water vapor, contamination and damage.

The LED chip 213 has a base layer 2131, a film layer 2132, a protecting layer 2133, an organic layer 2134, and a plurality of micro-holes 2135. The base layer 2131, the film layer 2132, the protecting layer 2133 and the organic layer 2134 are sequentially disposed on the first electrode 212, in that order from bottom to top.

The base layer 2131 is made from InP (indium phosphide) material, for supporting the film layer 2132, the protecting layer 2133 and the organic layer 2134. The film layer 2132 is made from InGaAsP (indium gallium arsenide phosphorus). The protecting layer 2133 is made from $SiO_2$ (silicon dioxide) material by a Metal Organic Chemical Vapor Deposition (MOCVD) method, and has a thickness of 100 nm-300 nm. Typically, the protecting layer 2133 is glass. The organic layer 2134 is made from polymethyl methacrylate (PMMA) by a MOCVD method, and has a thickness of 100 nm-500 nm.

The micro-holes 2135 are arranged in a regular, repeating array, and run through the film layer 2132, the protecting layer 2133 and the organic layer 2134. The micro-holes 2135 are formed by a Photolithography and Reactive Ion Etching technology method. Each micro-hole 2135 has a height of between 500 nm-800 nm and a diameter of between 100 nm-300 nm. The plurality of micro-holes 2135 form an optical crystal structure (also a photonic crystal structure) in which the refractive index changes at regular intervals, creating a photonic bandgap within a range of frequencies for the in-plane guided modes of the LED system. In all cases, these frequency ranges can be utilized to prevent radiation from propagating into the dielectric slab, thus forcing the light into the light-cone of the air region. Therefore, the extraction efficiency of the LED 210 is enhanced.

Figure 5:
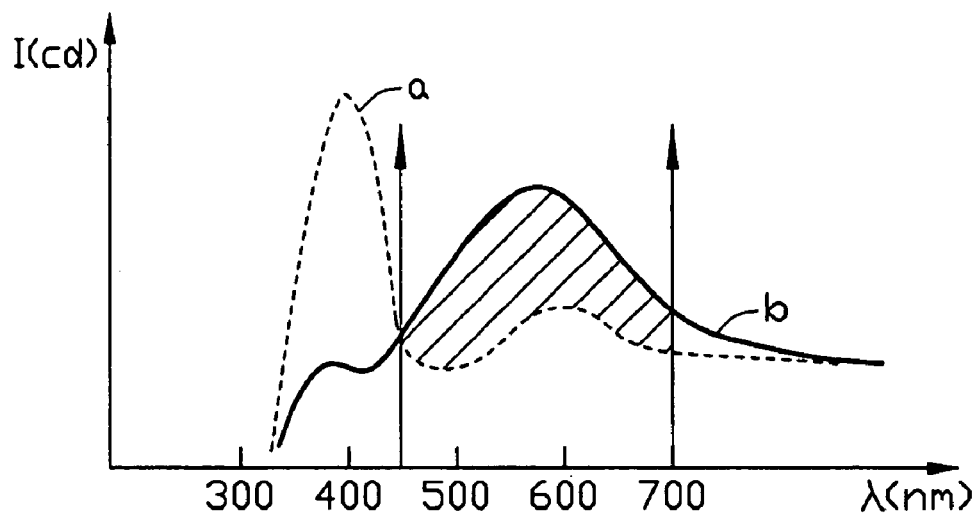
FIG. 5 is a graph of emission intensity versus wavelength, showing the emission intensity of the LED of FIG. 1 and the emission intensity of a conventional LED.

FIG. 5 is a graph of emission intensity versus wavelength, showing the emission intensity of the LED 210 having the optical crystal structure and the emission intensity of a conventional LED. In FIG. 5, 'a' denotes the emission intensity of the conventional LED, and 'b' denotes the emission intensity of the LED 210. In the visible light wavelength band of 450 nm-700 nm, the emission efficiency of the LED 210 having the optical crystal is greater than that of the conventional LED.

In operation, the micro-holes 2135 of each LED 210 efficiently prevent total internal reflection and diffusion of light beams in the LED 210. Therefore, the LED 210 efficiently utilizes light beams and enhances the emission intensity. Accordingly, light beams from the two LEDs 210 are introduced into the light guide plate 220 through the light incident surfaces 221, and are reflected to the emitting surface 222 of the light guide plate 220 in a direction substantially perpendicular to the emitting surface 222. Subsequently, the light beams are introduced into an LCD panel (not shown).

Figure 6:
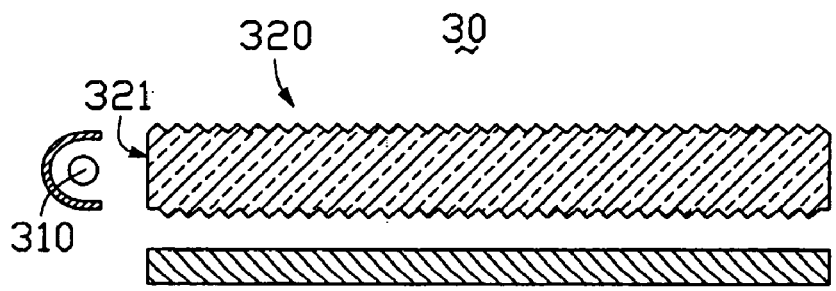
FIG. 6 is an exploded, cross-sectional view of a backlight system according to a second embodiment of the invention.
Figure 7:
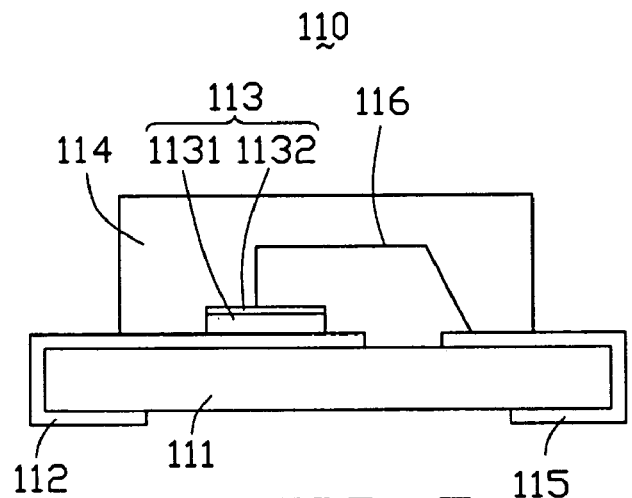
FIG. 7 is a side view of a conventional LED.
Figure 8:
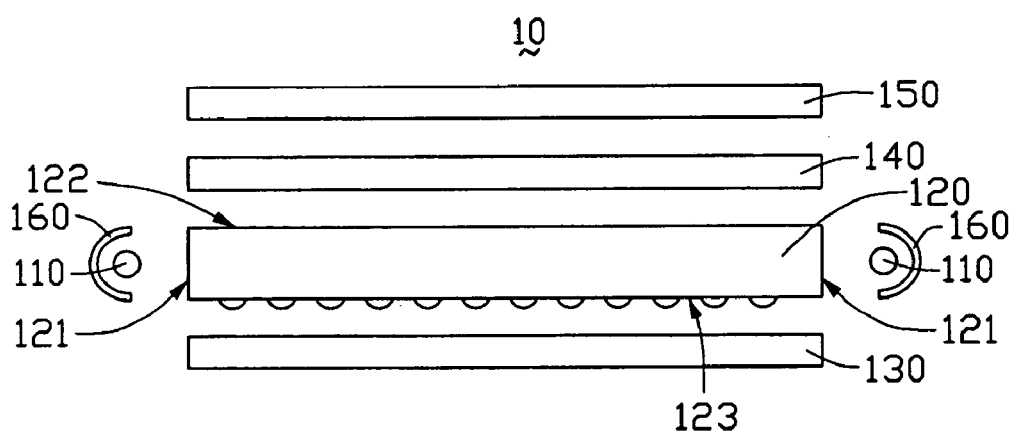
FIG. 8 is an exploded, side view of a conventional backlight system.

FIG. 6 shows a surface light source 30 in accordance with a second embodiment of the present invention. The surface light source 30 has a structure similar to that of the surface light source 20 of the first embodiment. However, the surface light source 30 has a light guide plate 320 with only one incident surface 321, and only one point light source 310.

The surface light source 20, 30 of the present embodiments has the advantage of high emission intensity. This is achieved by utilizing the optical crystal structure of the LED(s) 210, 310. Furthermore, because the surface light source 20, 30 has good optical characteristics by reason of the LED(s) 210, 310, there is no need for additional optical films (such as a brightness enhancing film (BEF) or a diffuser) to enhance the optical characteristics of the surface light source 20, 30. Thus the surface light source 20, 30 can be compact and inexpensive.

In alternative embodiments of the present invention, the material of the base layer 2131 can be GaAs (gallium arsenide), GaP (gallium phosphorus), $Al_2O_3$ (aluminum oxide), or SiC (silicon carbide). The film layer 2132 can be made from AlGaAs (aluminum gallium arsenide), AlInGaP (aluminum indium gallium phosphorus), GaN (gallium nitride), InGaN (indium gallium nitride), P—GaN (P-gallium nitride), or N—GaN (N-gallium nitride). The micro-holes 2135 can have a height of between 100-1000 nm, and a diameter of between 50 nm-600 nm. The protecting layer 2133 can be made by a thermal oxidation method, and the organic layer 2134 can be made by a Plasma Enhanced Chemical Vapor Deposition (PECVD) method.

It is to be understood that even though characteristics and advantages of the embodiments have been set forth in the foregoing description, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A backlight system, comprising:
   a light guide plate; and
   an LED (light emitting diode) emitting light beams into the light guide plate, the LED comprising an LED chip having a base, a film layer, a protecting layer, and an organic layer sequentially provided on a first electrode from bottom to top;
   wherein the LED chip further has an optical crystal structure comprising a plurality of micro-holes which run through the film layer, the protecting layer and the organic layer.

2. The backlight system of claim 1, wherein the LED further comprises a substrate, a second electrode formed on the substrate, and a wire electrically connecting the LED chip and the second electrode.

3. The backlight system of claim 2, wherein the LED further comprises an encapsulating resin covering the LED chip.

4. The backlight system of claim 1, wherein the micro-holes are arranged in a regular, repeating array.

5. The backlight system of claim 4, wherein a thickness of the protecting layer is in the range from 100 nm-300 nm.

6. The backlight system of claim 5, wherein a thickness of the organic layer is in the range from 100 nm-500 nm.

7. The backlight system of claim 6, wherein diameters of the micro-holes are in the range from 100 nm-300 nm.

8. The backlight system of claim 1, wherein a material of the base is selected from the group consisting of InP, GaAs, GaP, $Al_2O_3$, and SiC.

9. The backlight system of claim 1, wherein the film layer is made from a material selected from the group consisting of InGaAsP, AlGaAs, AlInGaP, GaN, InGaN, P—GaN, and N—GaN.

10. The backlight system of claim 1, further comprising a reflector disposed below the light guide plate.

11. A backlight system, comprising:

a light guide plate; and an LED (light emitting diode) emitting light beams into the light guide plate, the LED comprising an LED chip having a base, a film layer, a protecting layer, and an organic layer sequentially provided on a first electrode from bottom to top;

wherein the LED chip further has an optical crystal structure comprising a plurality of micro-holes arranged in a regular, repeating array;

wherein a thickness of the protecting layer is in the range from 100 nm-300 nm; and the protecting layer is made from silicon dioxide ($SiO_2$).

12. The backlight system of claim 11, wherein the organic layer is made from polymethyl methacrylate.

13. A backlight system, comprising:

a light guide member; and a light source having a solid, electrifiable light emitter to provide light for entry into said light guide member, said solid light emitter being structured so as to significantly enhance brightness of said light before said light enters said light guide member;

wherein said solid light emitter comprises a base, a film layer, a protecting layer, and an organic layer sequentially provided; and said solid light emitter is structured to have an optical crystal structure comprising a plurality of micro-holes which run through the film layer, the protecting layer and the organic layer.

14. The backlight system of claim 13, wherein said solid light emitter is a light emitting diode chip.

15. The backlight system of claim 13, wherein the protecting layer is made of silicon dioxide.

16. The backlight system of claim 13, wherein the organic layer is made of polymethyl methacrylate.

* * * * *